Nov. 10, 1959   R. J. GEARY   2,911,756
INSECT COMBATTING DEVICE
Filed Dec. 8, 1955
FIG. 1.
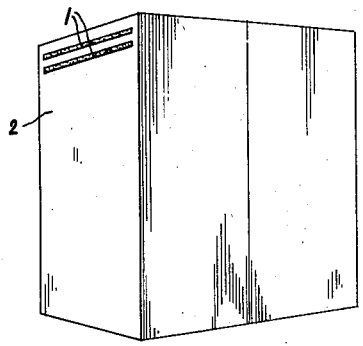
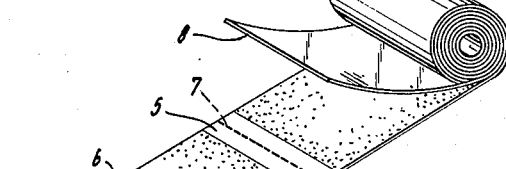
FIG. 2.
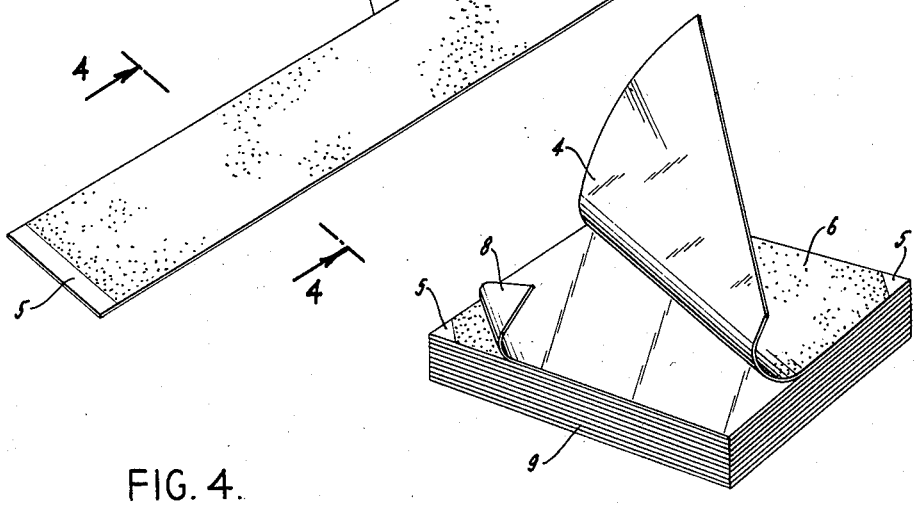
FIG. 4.
FIG. 3.
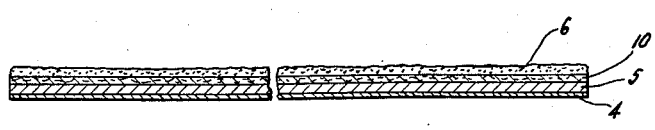
FIG. 5.
INVENTOR.
ROBERT J. GEARY
BY
Morton Amster
ATTORNEY.

United States Patent Office 2,911,756
Patented Nov. 10, 1959

2,911,756
INSECT COMBATTING DEVICE
Robert J. Geary, Blue Point, N.Y.
Application December 8, 1955, Serial No. 615,010
2 Claims. (Cl. 43—114)

This invention is directed to the provision of an insect combatting device, and more particularly to such a device of the type of the well known sticky fly paper.

The commonly known sticky fly paper, in the form of a tape or ribbon designed to be suspended from an elevated support, for example a lighting fixture or the like, is an extremely undesirable article except from the standpoint of its ability to entangle flies and other flying insects. It is very unsightly, particularly when covered with dead insects; it must be carefully handled to avoid soiling the fingers; in extremely warm weather the adhesive coating tends to flow and drop upon objects below; it occupies space desirable for other objects and uses; it is easily blown about by the wind and not infrequently comes into contact with the clothing or hair or other parts of the body of occupants of the room; and when suspended from a lighting fixture or the like it may be grasped by mistake by a person intending to turn on the light.

It is an object of this invention to provide an insect combatting device which will substantially avoid all of the above mentioned disadvantages of ordinary sticky fly paper. Another object of this invention is to provide an improved insect combatting device which is ornamental in appearance, economical to manufacture, and simple to use. Other objects and advantages will appear as the description proceeds.

The attainment of the above objects is made possible by the instant invention which comprises an insect combatting device comprising a flexible sheet backing, a normally tacky pressure sensitive adhesive united to one surface of said backing, and an insecticidal, insect attracting composition united to the other surface of said backing. Said adhesive and said insecticidal composition may be united to the surface of the backing directly or through one or more intermediate layers or coatings having an assistant function of their own or in combination. The device is similar to the common types of adhesive or pressure sensitive tape now available on the market except that the smooth surface of the tape is provided with an insecticidal insect attracting composition. Said composition must contain an attractant or bait for drawing or enticing the flying or crawling insects in the area to contact the device itself. Its insecticidal properties may be due to a sticky character which would hold the insects until they are dead, or its insecticidal properties may be due to inclusion in the composition of any of the commonly known insecticides. In its most preferred embodiment, the insect attracting composition is both sticky and contains an insecticide.

It will thus be seen that the device of the instant invention includes means operative to support it in any position in a room within or outside of the range of direct vision of occupants of the room. It may be readily attached to any convenient horizontal or vertical surface without marring or disfiguring the same and without recourse to the use of tacks, pins, nails, clips, or other types of fasteners, and it may be readily removed from the surface to which it has been attached without marring same. When in position for use, it presents a neat appearance, and may in fact be equipped with decorative or ornamental means such as suitable colors, designs and configurations, in addition to means for communicating or conveying intelligence and the like. The width of the device will of course depend on the particular use to which it is intended. Thus, for ordinary household use, a narrow flexible sheet is desirable of the order of one-quarter or one-half an inch in width. For control of flies and other insects on industrial premises or on farm premises where animals or poultry or the like are housed, the device may be up to six or more inches in width.

The flexible sheet backing, the normally tacky and pressure sensitive adhesive united to one surface of said backing, and the manner of producing the combination of flexible sheet backing and pressure sensitive adhesive are all well known in the art. Such backings, adhesives, and their methods of being united are for example disclosed in U.S. Patents Nos. 1,760,820, 2,156,380, 2,177,627, 2,251,273, and the like. In general, the flexible sheet backing may be non-waterproof, but it is preferably waterproof, and may be composed of fibrous or non fibrous materials, including felted or woven fabrics, ribbons and paper, whether coated, sized, or otherwise treated or not, cellulosic films of regenerated cellulose (cellophane), which may or may not be waterproof, cellulose esters such as cellulose nitrate, cellulose acetate and cellulose aceto-butyrate, cellulose ethers such as ethyl cellulose and benzyl cellulose, chlorinated rubber, rubber hydrochoride, polyethylene, and other synthetic resins having a basis for example of polyvinyl acetate and/or chloride, acrylic resins, polyesters, and the like. Paper, for example, when used as a backing, may be glassine paper, parchmentized paper or may be treated in any other manner to unify same and prevent its being torn when subjected to the stress involved in removing the device from a surface to which it has been previously adhered. Similar considerations apply to other fibrous flexible sheet backings.

The flexible sheet backing has united thereto on one surface thereof a normally tacky and pressure sensitive adhesive whereby the device may be attached or adhered to any desirable support by pressing the adhesive, with its backing and insect attracting composition, onto said support. Said adhesive composition is non-offsetting in that it is possessed of such coherence in relation to adhesiveness and is so firmly united to the flexible sheet backing that the device may be readily separated in a condition for reuse from surfaces to which it has been temporarily applied, without offsetting of adhesive material. The adhesive material is also in elastic equilibrium with the flexible sheet backing so that warping and curling of the sheet, and blistering of the adhesive coating and/or insect attracting composition, are avoided. In general, such adhesive compositions have a base of rubber and synthetic resin, although other film forming substances may be employed. Such compositions and their manner or production and uniting with the backing are well known and fully disclosed in the above mentioned patents and in many other patents. Also disclosed in said prior art are many other functional agents which may be added to the pressure sensitive adhesive coating or the flexible sheet backing or to the primer coat which may be first applied to the backing to secure better adhesion between the pressure sensitive adhesive and the flexible sheet backing.

In accordance with the invention, the outer surface of the flexible sheet backing is covered by an insecticidal, insect attracting composition. In its preferred embodiment, this composition is of a viscous, tacky consistency adapted to attract and hold the insect or entangle it. This tackiness or plasticity should be of a non-drying nature and should be capable of withstanding maximum summer temperature to which it may be subjected in actual use without running or becoming unduly fluid. The composition should contain an attractant or bait for the insect to induce the insect to alight upon the insectidial composition of the device of the instant invention. This attractant or bait may be of a type which functions by appearance, odor, taste, or any combination thereof. While not absolutely necessary where the stickiness is sufficient to entangle the insects permanently, it is preferred to include in the composition an insecticide which will kill the insect in a short period of time after it has contacted the instant insect attracting composition of the device of the instant invention. Desirably, the insecticidal, insect attracting composition should also contain a mold inhibitor to prevent decomposition during warm weather, the time of year when the device of the instant invention is in most prevalent use. Said composition may cover the entire surface of the flexible sheet backing, or only parts thereof. It may be applied to the backing in such manner as to leave uncoated areas whereby the device may be pressed on and adhered to a wall or other support without having the fingers come in contact with the insecticidal, insect attracting composition. Or it may be applied in an ornamental design or in any other suitable manner.

As a further feature of the invention, a surface or layer intermediate the insecticidal composition and the flexible sheet backing may be provided which will serve to better absorb and maintain in active state the insecticidal composition which is employed on the instant devices. Such intermediate layer may for example be composed of cellulose fibers matted, felted, or otherwise joined and bonded to the flexible sheet backing. When the insecticidal, insect attracting composition is applied thereover, it is absorbed thereby and kept in close contact therewith. Said intermediate layer may also be provided, if desired, with a hygroscopic substance such as glycerine or the like which assists in maintaining the insecticidal, insect attracting surface in a tacky state.

The device of the instant invention may be provided in the form of rolls of tape, or in stacks of short lengths, or in any other suitable manner. The rolls of tapes may be perforated at predetermined lengths to facilitate the detaching of short pieces thereof for use. In such devices, the areas adjacent the perforations are preferably devoid of insecticidal surfaces. Whether stacked, rolled, or otherwise packaged, it will be necessary to provide means for preventing the pressure sensitive adhesive surface from sticking to the insect attracting composition of the adjacent layer. This may be accomplished by use of a slip sheeting which may be made of glassine paper, parchmentized paper, cellophane, whether waterproofed or otherwise, or other similar type of smooth material which does not adhere to either the pressure sensitive adhesive or to the insectidical, insect attracting composition. The slip sheeting, whether in continuous or discontinuous form, should always be provided where there would otherwise be contact between the pressure sensitive adhesive of one surface with the insecticidal, insect attracting composition of the adjacent overlying portion of the device as packaged.

It will be apparent from the above that the instant invention is based upon the combination of the flexible sheet backing with the pressure sensitive adhesive united to one surface thereof and the insecticidal, insect attracting composition united to the other surface thereof. No claim is made to any of the individual components of this combination, since all are individually well known in the art. It is applicant's invention however, in combining these components, which has enabled the attainment of the improved and desirable results herein. The device may be produced in known manner by applying the pressure sensitive adhesive composition to one surface of the flexible sheet backing and the insecticidal insect attracting composition to the other surface in the usual manner. Thus, depending upon their consistency, they may be applied by dipping, rolling, melting and spreading with a doctor knife or the like, by calendering or frictioning, spraying, brushing or in any other known manner.

In its preferred embodiment, the insecticidal, insect attracting surface is sticky and contains an insecticide and an insect attractant, which latter may simultaneously provide the surface with its sticky or tacky property. The insecticide may be present in amounts ranging from about .01 to 5 or 10% by weight in the surface coating, depending upon its nature and the other components. As suitable insecticides, there may be mentioned the following, of any mixtures thereof:

Demeton (0,0 - diethyl - 0 - 2 - ethylmercaptoethyl thiophosphate), parathion (0,0-diethyl-0,p-nitrophenyl thiophosphate), dimethyl parathion (0,0-dimethyl analogue), EPN (ethyl p-nitrophenyl thionobenzene phosphonate), Malathion (0,0-dimethyldithiophosphate of diethyl mercaptosuccinate), OMPA (octamethyl pyrophosphoramide), dithio (tetraethyl dithiopyrophosphate), 0,0-dimethyl-1-hydroxy - 2,2,2 - trichloroethylphosphonate, 0,0-dimethyl-2,2-dichlorovinyl phosphate, 0,0-dimethyl-0-3-dimethyl-0-3-chloro-4 nitrophenyl phosphorothioate, 0,0-dimethyl-0-4-chloro-4 nitrophenyl phosphorothioate, 1-carbomethoxy-1-propen-2 yl dimethyl phosphate, 1-carbomethoxy-1-propen-2 yl diethyl phosphate, 0,0-diethyl-S-isopropyl mercaptomethyl dithiophosphate, DDT (dichlorodiphenyl trichloroethane), TDE (dichlorodiphenyl dichloroethane), Methoxychlor (dimethoxydiphenyl dichloroethane), chlordane ($C_{10}H_6Cl_8$), heptachlor, gamma benzene hexachloride, dieldrin (1,2,3,4,10,10-hexachloro-6,7-epoxy-1,4,4a,5,6,7,8,8a - octahydro-1,4,5,6-dimethanonapthalene), Isolan (1-isopropyl-3-methyl pyrazolyl-5-dimethylcarbamate), Geigy 22870 (3-methyl-pyrazolyl-dimethylcarbamate), pyrethrins, rotenone, sabadilla, arsenic salts, and fluoride salts.

The insecticidal surface also preferably contains a mold inhibitor or fungicide, such as tetramethyl thiuram disulfide, alkyl esters of propionic acid, aromatic mercurial compounds such as phenyl mercuric acetate and the like, honey (by virtue of the "royal jelly" in it), metallic thiocarbamates or the like, in amounts similar to those of the insecticide. The attractant and tack producing components may be any of those substances usually employed in the formulation of sticky flypapers. The usual diluents, binders, and the like may also be used. The following formulations in weight proportions, are only illustrative of insecticidal, insect attracting compositions which may be employed in the devices of the instant invention:

(A) 10% molasses
 80% corn grits
 9% honey
 1% 2,2,2-trichloro-1-hydroxyethyl phosphonate
(B) 50% sugar
 25% corn grits
 15% sand
 9% honey
 1% Malathion
(C) 10% molasses
 75% corn grits
 10% honey
 3% Isolan
 1.9% pyrethrins
 .1% tetramethyl thiuram disulfide The following example of a device produced in accordance with the instant invention is to be regarded as merely illustrative of one embodiment, and is not to be regarded as limitative. Parts are by weight.

*Example*

One surface of a tape of waterproofed cellophane is coated with a primer composition containing two parts of rubber latex, four parts of wood rosin, and one part of whiting, dried, and then the primed surface overcoated with a normally tacky, pressure sensitive adhesive composition comprising ten parts of plasticized plantation rubber, two parts of cumarone gum, and a half part of zinc oxide pigment. The pressure sensitive adhesive surface is then covered with a slip sheeting of heavily waxed paper, and the other surface coated first with an adhesive cellulose fiber mat containing 5% glycerine and then with an insecticidal, insect attracting composition comprising ten parts molasses, 80 parts corn grits, 9 parts honey and 1 part tetrethyl pyrophosphate. The tape is then rolled up with the slip sheeting between each layer.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

What I claim is:

1. An insect combatting device comprising a flexible sheet backing, a normally tacky, pressure sensitive adhesive united to one surface of said backing, and a layer containing an insect attractant and an insecticide united to the other surface of said backing and presenting a substantially smooth and uniformly tacky outer surface opposite said pressure sensitive adhesive.

2. An insect combatting device comprising a flexible sheet backing, a normally tacky, pressure sensitive adhesive united to one surface of said backing, an absorptive layer united to the other surface of said backing, and a layer containing an insect attractant and an insecticide united to said absorptive layer and presenting a substantially smooth and uniformly tacky outer surface opposite said pressure sensitive adhesive.

References Cited in the file of this patent

UNITED STATES PATENTS

| | | |
|---|---|---|
| 859,636 | Welch | July 9, 1907 |
| 2,081,095 | Mull | May 18, 1937 |
| 2,143,043 | Wexler | Jan. 10, 1939 |
| 2,157,449 | Berg | May 9, 1939 |
| 2,264,875 | Greuling | Dec. 2, 1941 |
| 2,315,772 | Closs | Apr. 6, 1943 |

FOREIGN PATENTS

| | | |
|---|---|---|
| 636,280 | France | July 10, 1928 |

OTHER REFERENCES

The Condensed Chemical Dictionary, Fourth Edition, published 1950 by Reinhold Publishing Corp., New York, N.Y., page 72. (Copy in Patent Office Library.)